Sheet 1. 2 Sheets.

F. G. Fowler.
Paddle Wheel.

No. 3,113. Reissued Sept. 8, 1868.

Witnesses.
P. T. Carman.
A Davidson

Inventor.
F. G. Fowler

N. PETERS, PHOTO-LITHOGRAPHER, WASHINGTON, D. C.

Sheet 2. 2 Sheets.
F. G. Fowler.
Paddle Wheel.
No. 3,113. Reissued Sept. 8, 1868.
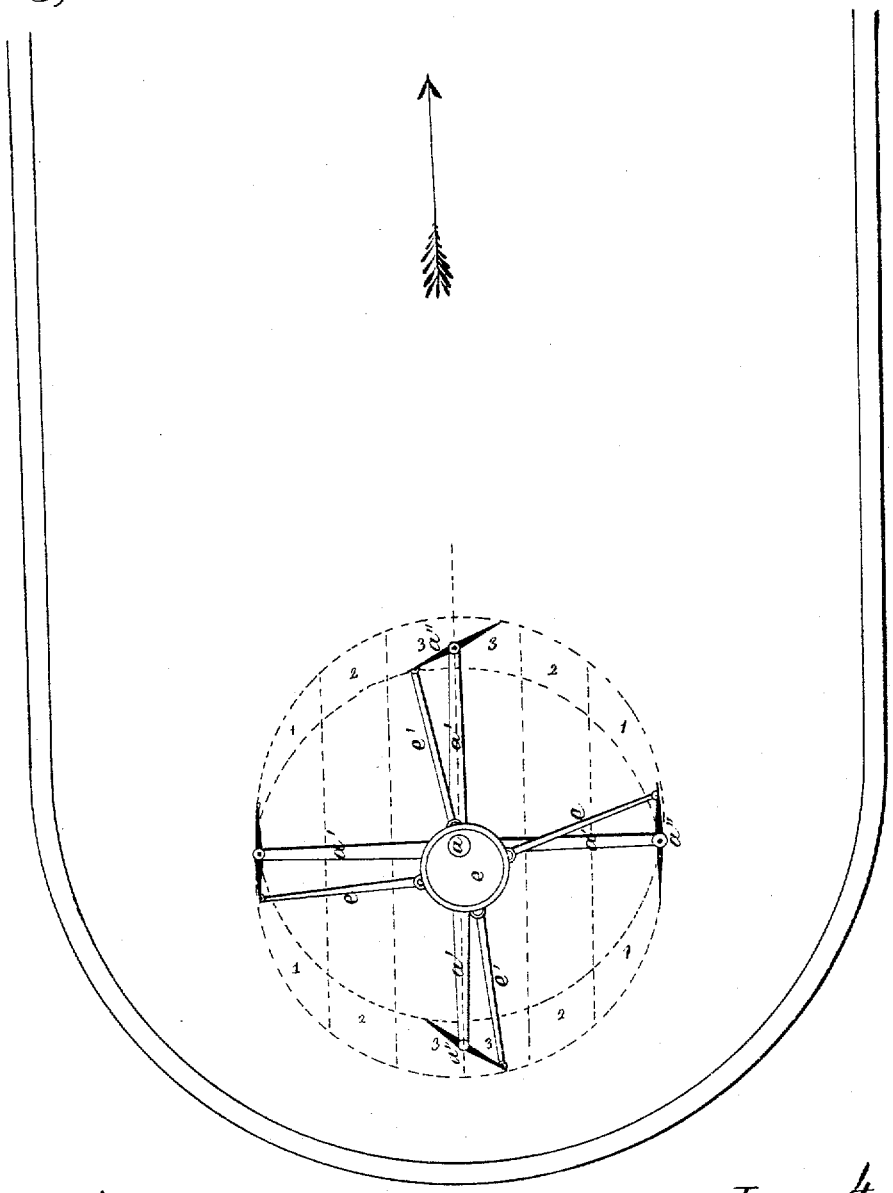
Witnesses
E. A. Ellesworth
A. W. Hart
Inventor.
F. G. Fowler
Per Munn & Co
Atty
N. PETERS, PHOTO-LITHOGRAPHER, WASHINGTON, D. C.

United States Patent Office.

F. G. FOWLER, OF SPRINGFIELD, ILLINOIS.

*Letters Patent No.* 65,202, *dated May* 28, 1867; *reissue No.* 3,113, *dated September* 8, 1868.

IMPROVED PROPELLER.

The Schedule referred to in these Letters Patent and making part of the same.

TO ALL WHOM IT MAY CONCERN:

Be it known that I, F. G. FOWLER, of Springfield, in the county of Sangamon, and State of Illinois, have invented a new and useful Improvement in Propeller; and I do hereby declare that the following is a full, clear, and exact description thereof, which will enable those skilled in the art to make and use the same, reference being had to the accompanying drawings, forming part of this specification.

This invention relates to a submerged marine propeller, which rotates on a vertical shaft, but which, for certain purposes, may be rotated on a horizontal shaft.

And the invention consists in attaching to the vertical shaft horizontal arms, to the extremities of which arms are attached the propelling-blades, by pivots placed on their vertical central lines.

These blades are made to oscillate on their pivots, as they are rotated by steam or other power, by the action of an eccentric and rods, thereby producing a sculling action, so that they propel during their entire circuit, and making the propelling-wheel a steering-wheel also, as will hereinafter be more fully described.

Figure 3 is an additional drawing, showing a top view of the propeller, with four blades, seen in different positions.

Similar letters of reference indicate corresponding parts.

The eccentric is attached to a sleeve on the shaft, and each blade is connected with it, and the propelling-force is exerted in the direction of its shortest radius or throw.

By suitable connections between the helm and the eccentric, the steersman is enabled to turn the eccentric, and thereby cast the propelling-force to any point of the compass.

By this means he is enabled not only to steer as with an ordinary rudder, but to back the boat, turn it on its centre, and produce a variety of movements, without checking, reversing, or in any way manipulating the engine or varying its action, the wheel serving the treble purpose of propeller, rudder, and reversing-gear.

Having recited the nature and purpose of my invention, I will now proceed to describe more particularly its construction and method of operation.

The wheel is located at the stern of the vessel, but it can be located at the sides, and the bearings which sustain it may be arranged in any desirable manner, or so that the propeller will be held in a proper position, and at a sufficient depth in the water.

The propeller consists of a shaft, *a*, stepped in a suitable bearing, with its upper end terminating in a crank or any other suitable device, whereby the power of the engine may be imparted to give it a rotating motion.

From the shaft two or more arms, *a'*, extend, constructed with diverging extremities.

These arms are sword-shaped, or otherwise formed, so as to meet with little resistance in their passage through the water.

*a''* represents the blades, which are rectangular in form, and attached to the extremities of the arms by hinges placed on their vertical central lines.

Surrounding the shaft *a*, and extending to the upper bearing of the shaft, is a loosely-fitting tube or sleeve, E, to the lower end of which is attached the eccentric, *e*.

From the eccentric band the radial rods, *e'*, extend, which are attached to the blades by pivots, at a distance equal to the throw of the eccentric from the vertical central line of the blades; yet the distance may be greater or less than that, if it is desired to diminish or increase the pitch of the propeller.

The rods may be made flexible, or slightly yielding, near the point of attachment to the band of the eccentric.

Figure 1:
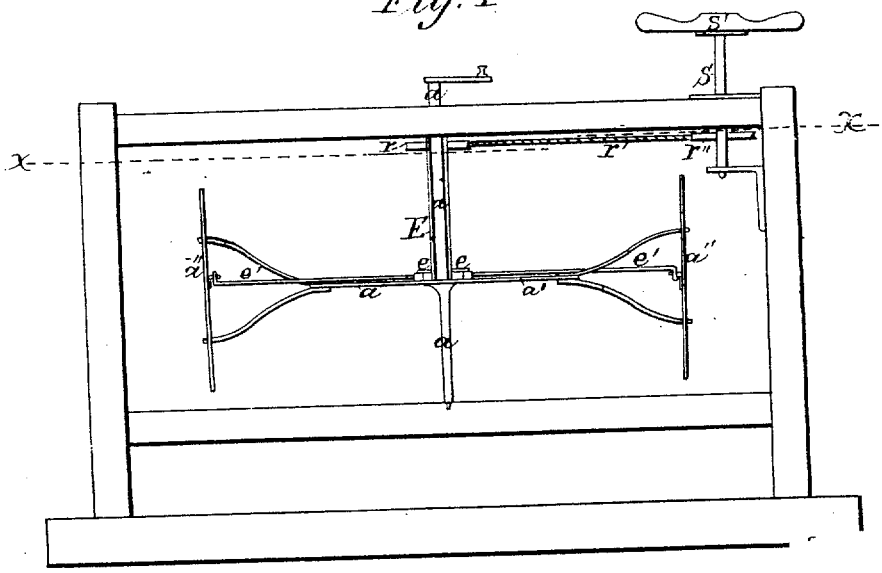
Figure 1 is a sectional side elevation of the wheel.
Figure 2:
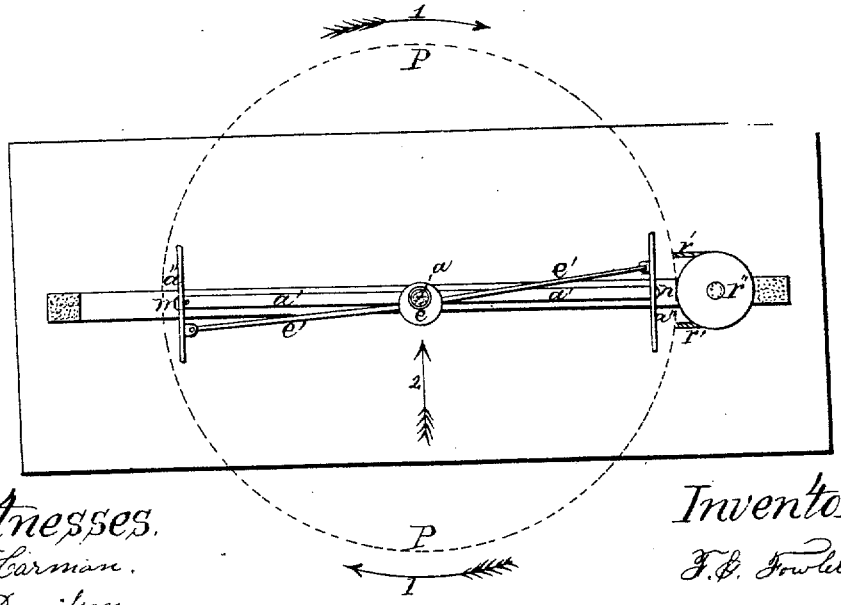
Figure 2 is a horizontal section of the same through line *x x*.

Their length is such that, when the longest radius of the eccentric is perpendicular to a line drawn through their pivots, the blades to which they are pivoted will be perpendicular to the arms on which the blades are hung, as seen at *m* and *n*, fig. 2.

The blades will then be inclined to a line perpendicular to the arms, at an angle of about thirty degrees, (more or less,) when the radius of the eccentric is parallel with a line drawn through the pivots of the eccentric-rods.

At the upper extremity of the sleeve E, and secured to it, is placed the chain-wheel, *r*, and around the wheel passes the chain *r'*, which also passes around a corresponding chain-wheel, *r''*, which is secured to the vertical shaft *s*.

This shaft *s* enters the pilot-house, and to its upper extremity there is attached the helm or tiller, *s'*; the arrangement of the various parts being such that, when the tiller is turned by the steersman, the eccentric will be turned, and make a corresponding rotation upon the shaft of the propeller, and the blades will oscillate on their pivots.

The operation is as follows:

Let the tiller be turned by the steersman till the longest radius of the eccentric extends in a direction opposite the stem of the vessel, or that indicated by arrow 2, fig. 2.

When the propeller is in motion in the direction of arrow 1, a blade, in passing the point *m*, is at right angles to the arm. As it passes that point, its rear edge is gradually drawn in by the eccentric-rod attached to it, till it arrives at the point *p*, when it forms an angle of twenty-six degrees with a line perpendicular to the arm. As it passes that point, its rear edge is gradually forced out till it arrives at *n*, when it is again at right angles to the arm.

After passing the point *n*, it is still further forced out till it arrives at *q*, when it forms an angle of thirty-four degrees with a line perpendicular to the arm.

After passing the point *q*, its rear edge is gradually drawn in till it arrives at its original position, meanwhile exerting a propelling-force throughout its entire circuit, except when passing the two points *m* and *n*.

If the helm be turned half a revolution, so that the short radius of the eccentric extends in the opposite direction, the propelling-force will be exerted in the opposite direction, thereby backing the boat.

If the helm be turned ninety degrees, so that the short radius of the eccentric is perpendicular to the keel of the vessel, and extends to the left, the propelling-force will be exerted laterally, and the vessel will revolve on its centre.

If the helm be turned so that the short radius of the eccentric is perpendicular to the keel, and extending to the right, the vessel will revolve on its centre in the opposite direction.

By turning the helm so that the short radius of the eccentric shall be intermediate between the above-named points, the vessel may be steered to starboard or port and forwards, or to starboard and port and backwards, at any inclination desired.

The greater the inclination of the eccentric, the shorter will be the curve described by the motion of the boat.

By allowing the eccentric to revolve with the shaft of the propeller, the blades will cease their oscillating motion, and the wheel will exert no propelling-force.

It will thus be seen that, by properly operating the helm, the vessel may be moved forward or backward in a direct line, or in a line of any desired curvature, or turned in either direction on its centre, or brought to a state of rest, without modifying in any manner the action of the engine.

This propeller may be adapted to submarine boats, by having the shaft placed in a horizontal position, and near the middle of the boat, where it can be made to exert a propelling-force forward or backward, downward or upward, causing the boat to move either way, sink below the surface, and rise again.

I claim as new, and desire to secure by Letters Patent—

1. The blades *a''*, constructed, arranged, and operating substantially as and for the purposes herein shown and described.

2. The eccentric, *e*, with its band, and the rods *e'*, arranged and operating substantially in the manner and for the purposes set forth.

3. The removable eccentric *e*, applied to steering purposes, and arranged in the manner and for the purpose set forth.

4. The sleeve E, chain-wheels *r* and *r''*, chain *r'*, and shaft *s*, or their equivalents, when used substantially as and for the purpose described.

5. A propeller, constructed of the parts above described, arranged and operating as a combined steering-wheel and propeller, substantially as set forth.

F. G. FOWLER.

Witnesses:

WM. F. MCNAMARA,

ALEX. F. ROBERTS.